United States Patent
Cameron et al.

(10) Patent No.: US 6,938,367 B2
(45) Date of Patent: Sep. 6, 2005

(54) TENSION MEASURED FISHING LINE BITE DETECTOR ALARM

(76) Inventors: Michael James Cameron, 10336 Key Lantern Dr., Newport Richey, FL (US) 34654; Robert E. Rouse, 13220 Houston Ave., Hudson, FL (US) 34667

( * ) Notice: Subject to any disclaimer, the term of this patent is extended or adjusted under 35 U.S.C. 154(b) by 1 day.

(21) Appl. No.: 10/718,413

(22) Filed: Nov. 20, 2003

(65) Prior Publication Data

US 2005/0011105 A1 Jan. 20, 2005

Related U.S. Application Data

(63) Continuation-in-part of application No. 10/310,339, filed on Dec. 5, 2002, now abandoned, which is a continuation-in-part of application No. 10/218,781, filed on Aug. 14, 2002, now abandoned, which is a continuation-in-part of application No. 10/056,697, filed on Jan. 25, 2002, now abandoned.
(60) Provisional application No. 60/314,962, filed on Aug. 25, 2001.

(51) Int. Cl.$^7$ ............................................... A01K 97/12
(52) U.S. Cl. ............................................................ 43/17
(58) Field of Search .............................................. 43/17

(56) References Cited

U.S. PATENT DOCUMENTS

| 3,798,630 | A | 3/1974 | Crosthwalt |
| 3,959,910 | A | 6/1976 | Montgomery |
| 4,586,284 | A | 5/1986 | Westwood, III |
| 5,125,181 | A | 6/1992 | Brinton |
| 5,261,180 | A | 11/1993 | Foster et al. |
| 5,396,726 | A | 3/1995 | Zepeda, Sr. |
| 5,771,624 | A * | 6/1998 | Vickery et al. ............... 43/17 |
| 5,867,931 | A | 2/1999 | Morris et al. |
| 5,894,691 | A | 4/1999 | Zepeda, Sr. |
| 6,098,331 | A | 8/2000 | Kim et al. |
| 6,408,561 | B1 | 6/2002 | Winter |
| 6,594,942 | B1 | 7/2003 | Sherwood et al. |

* cited by examiner

*Primary Examiner*—Kurt Rowan

(57) ABSTRACT

A battery powered fishing line bite detector alarm producing visible and/or audible alarm signals is disclosed. An arm, installed within the alarm, integrally connects to a modified leaf on-off switch. The alarm attaches to a fishing rod in front of a fishing reel mounted on the rod. Fishing line is threaded into the arm and adjusted such that slack is provided between the rear of the alarm and the front of the reel thereby allowing forward arm movement. The fishing line is further inserted until desired resistance of forward and backward line movement within the arm is achieved. Applied tension to the line forces the arm to actuate. A tension spring clip connected to a switch lever, and a common leaf contact arm, pulls contact arm closer to an upper common contact point until contact is made activating the alarm signals. Increased tensioning pulls the line through a variable sized slit and into a line hole, releasing tension on the arm and causing the contact arm and contact point to break contact, while allowing the arm to return to a self-adjusting alarm casing position.

27 Claims, 10 Drawing Sheets

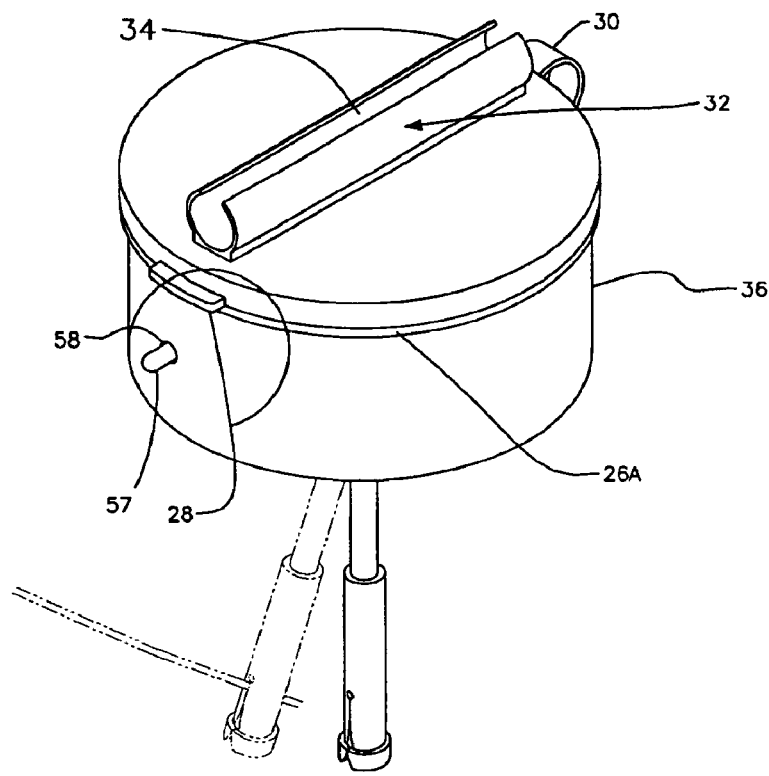
FIG. 2
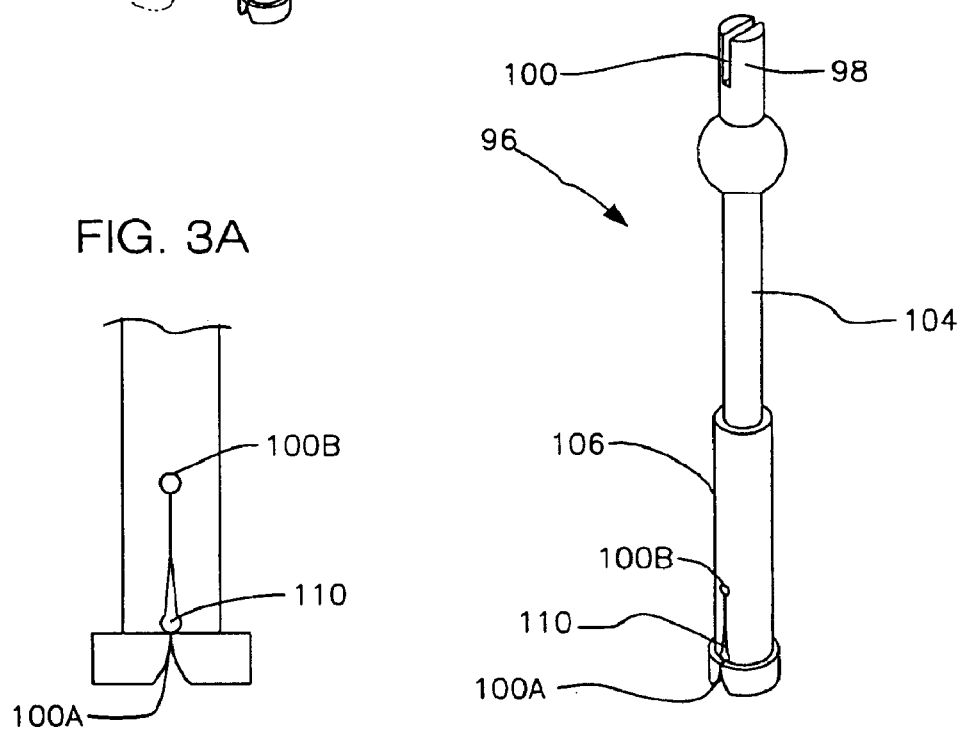
FIG. 3
FIG. 3A

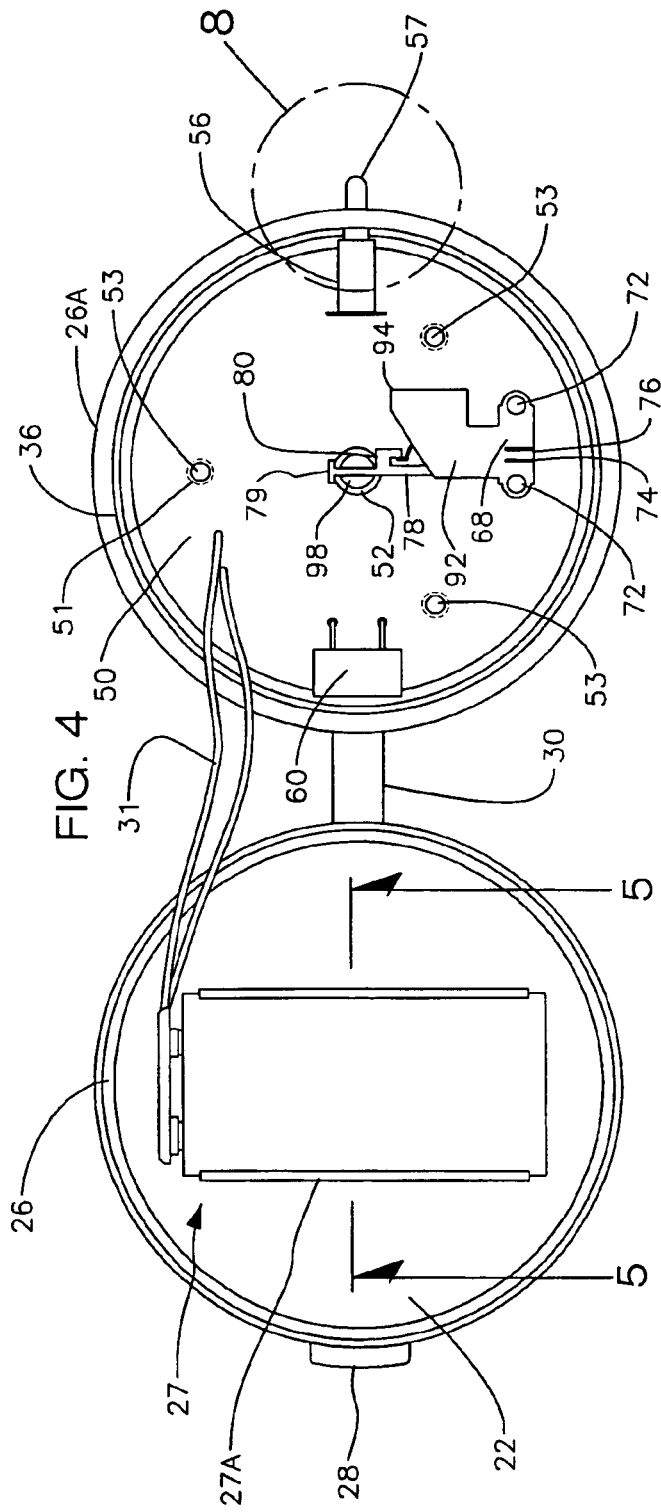
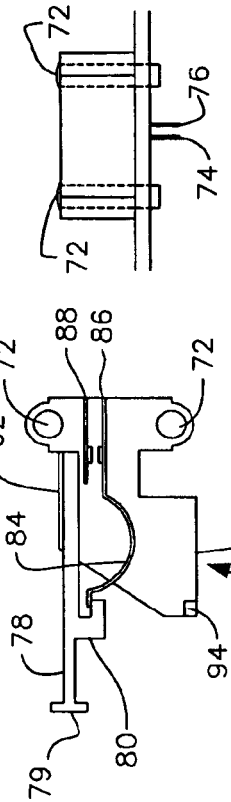
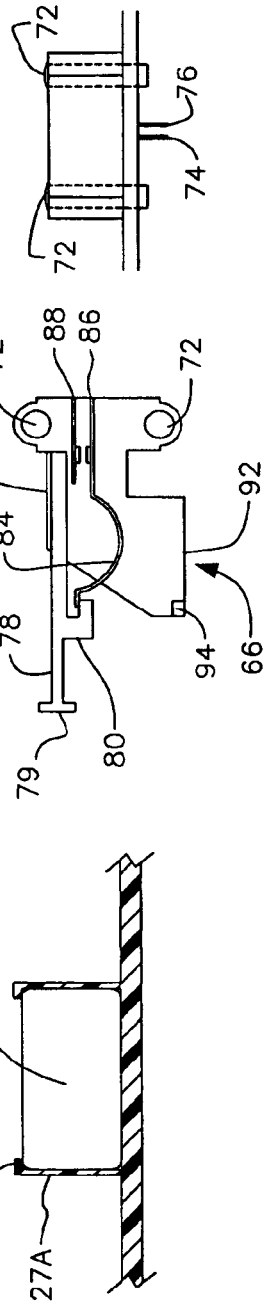

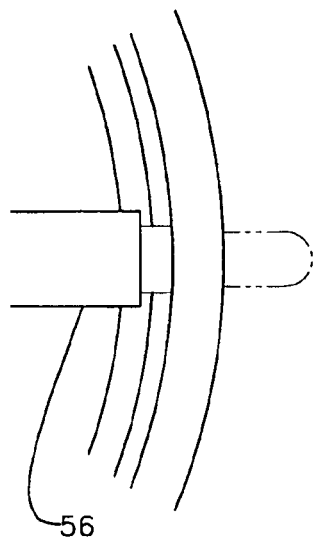
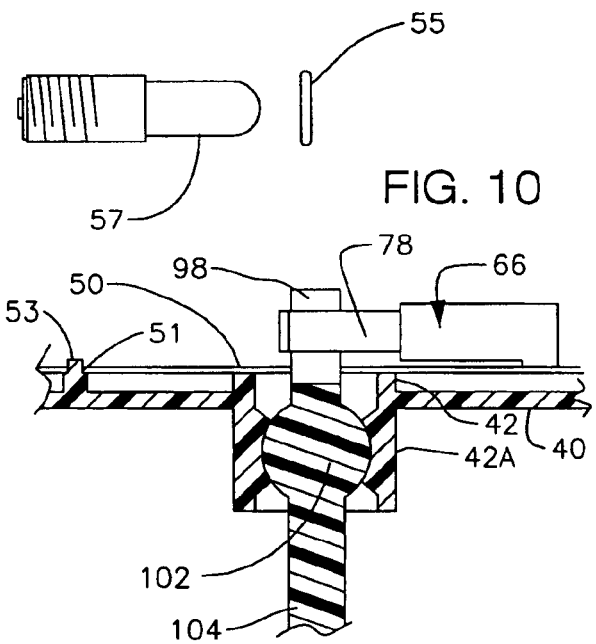
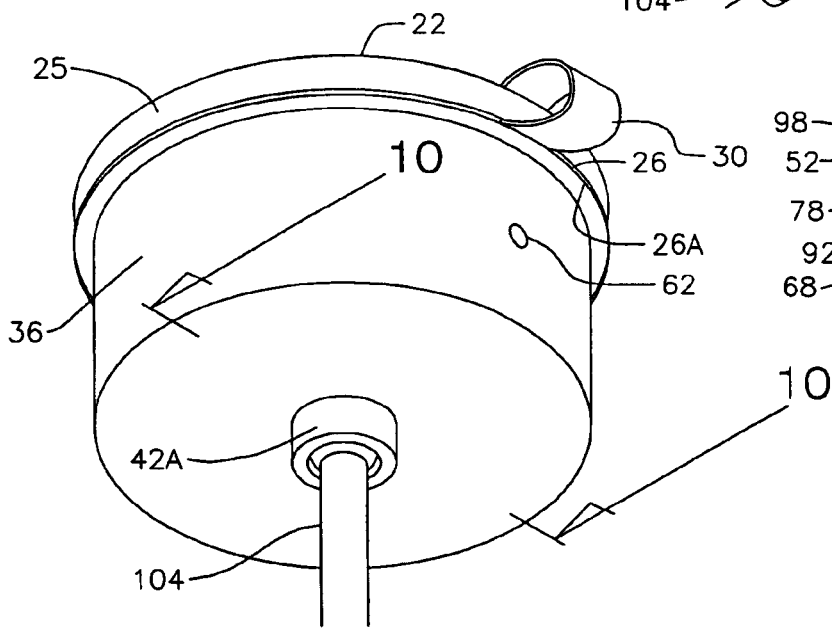

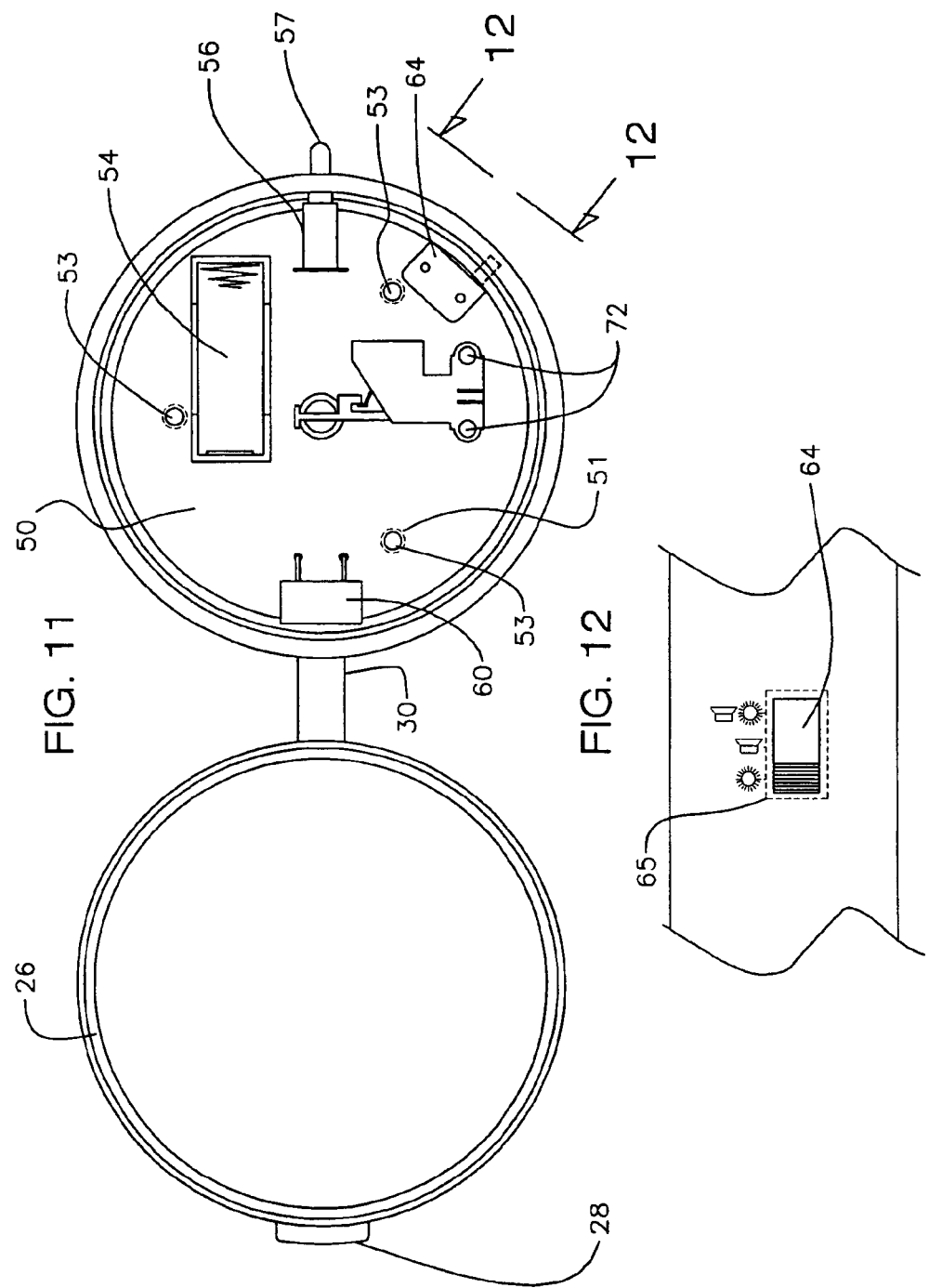

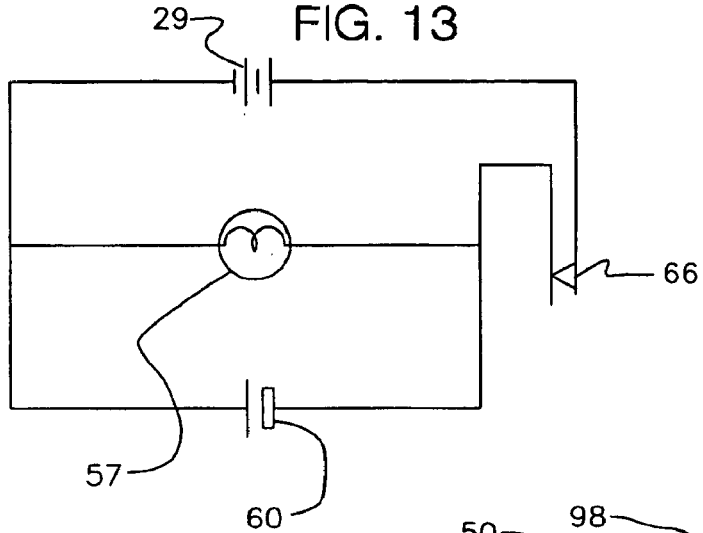
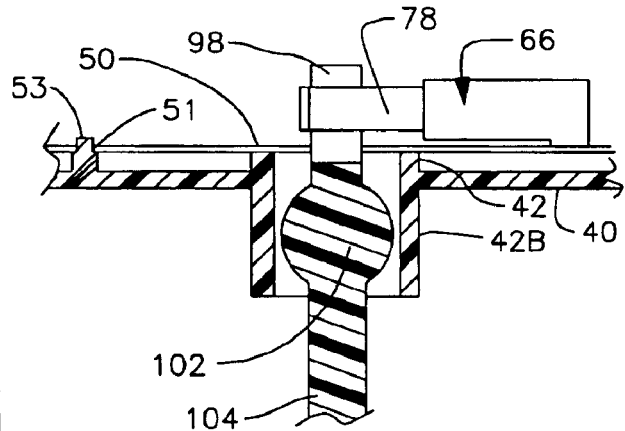
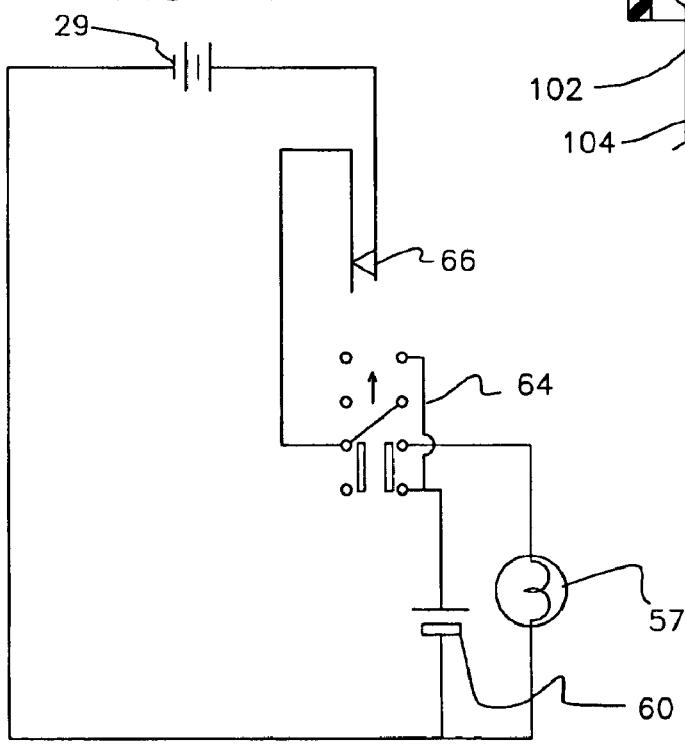

TENSION MEASURED FISHING LINE BITE DETECTOR ALARM

CROSS-REFERENCE TO RELATED APPLICATIONS

This is a continuation-in-part patent application which bases priority on continuation-in-part patent application Ser. No. 10/310,339 filed Dec. 5, 2002, currently pending, which bases priority on continuation-in-part application Ser. No. 10/218,781 filed Aug. 14, 2002, now abandoned, which bases priority on application Ser. No. 10/056,697 filed Jan. 25, 2002, now abandoned, which bases priority on provisional patent application Ser. No. 60/314,962 filed Aug. 25, 2001.

BACKGROUND OF THE INVENTION

1. Field of the Invention

This invention relates mainly to fish bite detectors and indicators, that are used with fishing rods and the fishing line of their reels.

2. Description of the Prior Art

Many anglers are discouraged by the prospect of having to constantly have their hands on their fishing rods, relying on physically touching the fishing line, or having to constantly watch the rod and the fishing line, in order to be able to anticipate that a fish is going to strike or has struck. Moreover, having the ability to effectively monitor when using many fishing rods in order to catch many fish in a short amount of time, or to be able to set down the fishing rod to do things, or to improve the odds of catching fish at night is desirable. This invention comprises a battery powered means removably mountable on any fishing rod, producing a luminated and or audible alarm signal for alerting anglers that a fish is either nibbling on the bait or has been hooked, that they might take the proper action necessary in order not to loose the fish. Over the years there have been many fish bite indicators developed to be used in combination with a fishing rod and the line of it's reel in an attempt to solve the problems and fulfill the desires described above. However, they suffer from imperfections such as being bulky, heavy, or fragile, and are made from numerous parts making attaching to and removing from the fishing rod a discouraging task, some have been designed so that the fishing line at all times must pass through some component while retrieving the fish without any tension relief to that component, or designed so that the fishing line falls out of a component every time a fish strikes and has to be reinserted, or designed so that the components have to be turned off or back on, or readjusted every time a fish is caught. Others are electrically designed requiring expensive wiring, with certain electronic designs requiring expensive components, all cases mentioned above either being so elaborate that they are too costly for the average angler, or just ineffective.

Applicants are aware of the below listed bite detector alarms used in combination of a fishing rod and the line of it's reel:

Kuczynski, U.S. Pat. No. 2,574,333, Patented November 1951.
Weber, U.S. Pat. No. 2,741,055, Patented April 1956.
Collins, U.S. Pat. No. 2,755,590, Patented July 1956.
Kravitch, U.S. Pat. No. 2,925,682, Patented February 1960.
Morrison, U.S. Pat. No. 3,037,317, Patented June 1962.
Finefield, U.S. Pat. No. 3,188,767, Patented June 1965.
Kricksfield, U.S. Pat. No. 3,228,135, Patented January 1966.
Riley, U.S. Pat. No. 3,599,368, Patented August 1971.
Watts, U.S. Pat. No. 3,702,513, Patented November 1972.
Grosthwait, U.S. Pat. No. 3,798,630, Patented March 1974.
Periman, U.S. Pat. No. 3,835,462, Patented September 1974.
Trosper, U.S. Pat. No. 3,878,635, Patented April 1975.
Fillmen, U.S. Pat. No. 3,913,255, Patented October 1975.
Montgomery, U.S. Pat. No. 3,959,910, Patented June 1976.
Hope, U.S. Pat. No. 4,020,578, Patented May 1986.
Smith, U.S. Pat. No. 4,399,631, Patented August 1983.
Westwood III U.S. Pat. No. 4,586,284, Patented May 1986.
Peck, U.S. Pat. No. 5,010,678, Patented April 1991.
Brinton, U.S. Pat. No. 5,125,181, Patented June 1992.
Meissner, U.S. Pat. No. 5,228,228, Patented July 1993.
Foster, U.S. Pat. No. 5,261,180, Patented November 1993.
Zepeda, Sr, U.S. Pat. No. 5,396,726, Patented March 1995.
Vickery et al. U.S. Pat. No. 5,771,624, Patented June 1998.
Zepeda, Sr, U.S. Pat. No. 5,894,691, Patented April 1999.

SUMMARY OF THE INVENTION

Our invention comprises an innovated, compact, and light weight battery powered bite detector alarm, that quickly and efficiently connects to and disconnects from a rod and the line from its reel, and moreover effectively capable of providing resistance against false alarm signals due to water conditions, the movement of a live bait fish on a fishing line, or when the fishing line is being cast from a reel, and making it necessary to install the fishing line to the bite detector alarm only once during the course of the day or night fishing activity. The structure and mechanism design of our bite detector alarm, utilizes simple and effective technology improving on the imperfections mentioned above, experienced by these type of devices in the past.

Various advantages and features of novelty which characterize our invention are pointed out with particularity in the claims annexed hereto and forming a part hereof. However, for a better understanding of the invention, its advantages, and objects obtained by its use, reference should be had to the drawings which forms a further part hereof, and to the accompanying descriptive matter, in which there are illustrated and described certain preferred embodiments of the invention.

BRIEF DESCRIPTION OF THE DRAWINGS

FIG. 2 is an isometric view of the present invention.

FIG. 3 is an isometric view of a preferred embodiment of the present invention.

FIG. 3A is an isolated orthographic view of a preferred embodiment of the present invention.

FIG. 4 is an orthographic assembly view of preferred embodiments of the present invention.

FIG. 5 is a cross sectional view of preferred embodiments of the present invention along lines 5—5 of FIG. 4.

FIG. 6 is an orthographic bottom view of a preferred embodiment of the present invention.

FIG. 6A is an orthographic top view of a preferred embodiment of the present invention.

FIG. 7 is an orthographic back view of a preferred embodiment of the present invention.

FIG. 8 is an orthographic view of preferred embodiments of the present invention.

FIG. 9 is an isometric view of the present invention.

FIG. 10 is a cross sectional view of preferred embodiments of the present invention along lines 10—10 of FIG. 9.

FIG. 11 is an orthographic assembly view of preferred and additional embodiments of the present invention.

FIG. 12 is an isolated orthographic view of an additional embodiment of the present invention.

FIG. 13 is a schematic diagram of the preferred embodiments of the present invention.

FIG. 14 is a schematic diagram of the preferred and additional embodiments of the present invention.

FIG. 15 is a cross sectional view of preferred and additional embodiments of the present invention.

Figure 1:
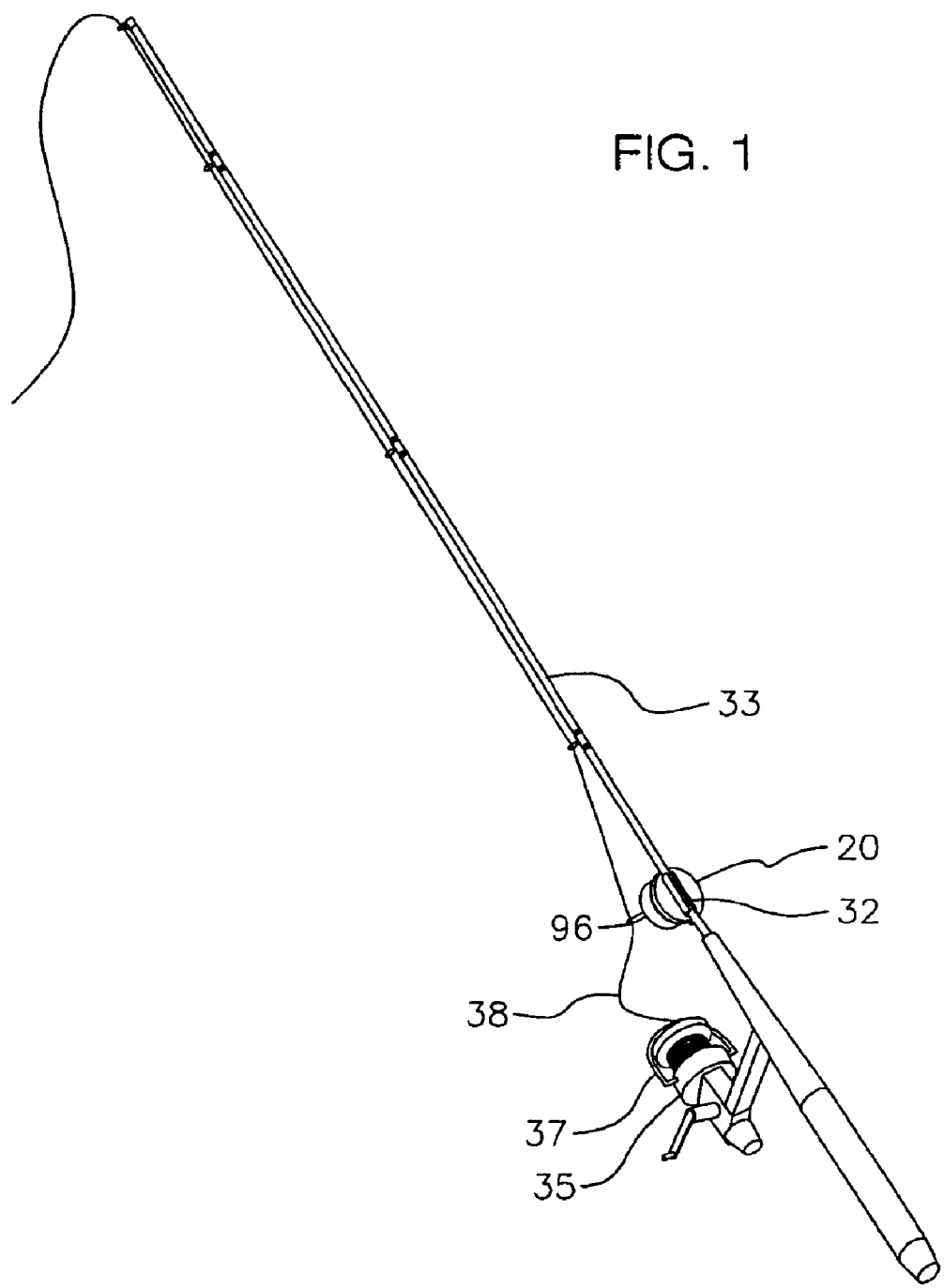
FIG. 1 is a perspective view of the present invention in operation on a fishing rod.

REFERENCE NUMERALS IN THE DRAWINGS 20 tensioned measured fishing line bite detector alarm.
22 housing lid.
25 vertical side.
26 & 26A horizontal lips.
27 battery holder.
27A plurality of parallel vertical sides.
27B 90 degree lip.
28 finger grip protrusion.
29 battery.
30 hinge.
31 battery connector.
32 pole clip.
33 fishing rod.
34 molded gap.
35 reel.
36 housing body.
37 reel bail.
38 fishing line.
40 cylindrical housing bottom.
42 open ended interior section.
42A snap action socket exterior section.
42B open ended exterior section.
50 round printed circuit board.
51 stationary board pin holes.
52 centered hole.
53 stationary board pins.
54 PC board mountable battery holder.
55 plurality of rubber grommets.
56 lamp socket.
57 filamented incandescent screw based lamp.
58 molded lamp hole.
60 electro magnetic buzzer.
62 molded buzzer hole.
64 three position switch.
64A five position switch.
64B four position switch.
65 molded switch hole.
65A molded switch hole.
65B molded switch hole.
66 modified leaf on off switch.
68 switch housing.
72 switch support pins.
74 upper common contact terminal pin.
76 common leaf contact arm terminal pin.
78 switch lever.
79 Tee section.
80 L section,
84 tension spring clip.
86 common leaf contact arm.
88 upper common contact point.
92 molded top with integral contouring left and right ides.
94 witch lever stop pin.
96 actuator arm.
98 slotted stem section.
100 top slot.
100A bottom slot.
100B line hole.
102 pivot ball section.
103 pivot pin.
104 mid arm section.
106 slotted bottom section.
110 variable sized slit.

DETAILED DESCRIPTION OF THE PREFERRED EMBODIMENT

FIGS. 1, 2, 4, 9, and 10 show a bite detector alarm 20 of the current invention.

Referring FIG. 3, an actuator arm 96 is shown that is a solid cylindrical injection molded piece comprising, a slotted stem section 98, having a top slot 100 molded horizontally across the center of stem section 98 approximately 90 degrees in relation to a bottom slot 100A, a variable sized slit 110, and a line hole 100B, all molded within a slotted bottom section 106. As shown in FIG. 10, section 98 extends downward into approximate top center of a spherical pivot ball section 102, a mid arm section 104 extending extends downward from approximate bottom center of section 102 and transitions to section 106 (see FIG. 3). As shown in FIG. 3A, slot 100A comprises rounded sides, upwardly tapering until touching together and transitioning to slit 110, and slit 110 upwardly tapering and transitioning to hole 100B. In the preferred embodiment, a lathe turned actuator arm made of pomalux, acetyl copolymer, provided by Tropical Plastics of Clearwater Fla., was used to illustrate a working injection molded arm 96. However, the actuator arm can be injection molded using pomalux, acetyl copolymer, polyethylene, polypropylene, vinyl, nylon, rubber, or any other material that can be injection molded.

Referring to FIG. 4, a PC board mountable lamp socket 56 is shown receiving a filamented incandescent screw based lamp 57, and a PC board mountable electro magnetic buzzer 60. In the preferred embodiment, the lamp socket part, ES 544 with the E-5 based lamp, 9.6v 0.5A 04.7×15 mm, and the electro magnetic buzzer part FTMB-12, Spl: 85 db/10 cm, rated voltage 12 vdc, rated current: 40 mA, were provided by Shogyo International Corp of Plainview N.Y.

Referring to FIGS. 4, 6 and 6A, a PC board mountable modified leaf on-off switch 66 is shown, containing an upper common contact terminal pin 74 and a common leaf contact arm terminal pin 76, both molded in a switch housing 68, terminal pins 74 and 76 soldering to socket 56, buzzer 60 and a battery connector 31, on a bottom side of a round printed circuit board 50. Approximate left and right sides of housing 68 comprise a plurality of molded circular switch support pins 72, extending down and connecting on the bottom side of board 50 at a plurality of points. A switch lever 78 has an L section 80 molded horizontally outward, then vertically downward lateral a side of lever 78, a tee section 79 horizontally molded lateral a top end of lever 78, lever 78 being molded to and extending from a front side of housing 68. Lever 78 integrally connects into slot 100 in arm 96. An upper common contact point 88 and a common leaf contact arm 86, both run parallel with lever 78. A tension spring clip 84 attaches to L section 80 and contact arm 86. A molded top is also provided having integral contouring left and right sides 92, including a switch lever stop pin 94. In the preferred embodiment, the leaf on-off switch, part # 16P58, rating 30 vdc 1A, mechanical life 300,000 cycles, provided by mouser electronics of Mansfield Tex., was used as a required element in the alarm 20 prototype, after it was modified by removing the lower common contact point, shortening lever 78 and adding tee section 79 to the top of lever 78, downwardly extending stop pin 94 level with the bottom edge of L section 80, rerouting terminal pins 74 and 76 from the back to the bottom of housing 68, and adding switch support pins 72 to housing 68.

FIGS. 4 and 5 show a battery 29 secured within a battery holder 27, and connector 31 connected to battery 29.

FIGS. 4, 10, 11 and 15 show round printed circuit board 50 having socket 56 receiving lamp 57, buzzer 60, switch 66, and connector 31 soldered thereto. Board 50 has a centered hole 52. Switch 66 is soldered onto board 50 so that lever 78 is positioned centrally over hole 52, placing tee section 79 on approximate edge of hole 52. A face of socket 56, a sound hole of buzzer 60, and connector 31 are all positioned on approximate edge of board 50 at a plurality of points. Included are a plurality of stationary board pin holes 51 within Board 50 at a plurality of points. In the preferred embodiment, a circuit board prototype made from perforated board, cut with a hole saw, the centered hole made with a drill bit, was hand wired to illustrate a working printed circuit board. Another prototype was made to illustrate production requirements for manufacturing printed circuit boards for our tension measured fishing line bite detector alarms by also cutting with a hole saw, a printed circuit board made from copper, the centered hole also made with a drill bit. The board was then cleaned, the circuit design layout transferred to the board then traced with resist ink. The board was then etched and the holes for all components drilled, the components then soldered to the board at a plurality of points.

FIGS. 1, 2, 4, 9, and 10 show an opaque injection molded cylindrical plastic housing, comprising an operatable housing lid 22, lid 22 including a vertical side 25 having a molded horizontal lip 26 lateral an interior surface of vertical side 25. A finger grip protrusion 28 is molded onto an exterior side of lid 22, at an approximate 180 degree position referencing rear side of alarm 20. Battery holder 27 is molded onto an interior side of lid 22, holder 27 comprises a plurality of parallel vertical sides 27A, each including a 90 degree lip 27B inwardly molded on a bottom edge of each vertical side 27A for the entire length. A housing body 36 includes a cylindrical vertical side, having a horizontal lip 26A, molded lateral the exterior circumference of the cylindrical vertical side, and a hinge 30 molded onto the exterior side of lid 22 and onto lip 26A lateral the exterior circumference of the cylindrical vertical side. Housing body 36 also includes a molded lamp hole 58 and a molded buzzer hole 62 formed therein. Body 36 is molded to a cylindrical housing bottom 40, having a plurality of stationary board pins 53, molded onto an interior side of housing bottom 40 at a plurality of points.

FIG. 10 shows an open ended interior section 42 that is cylindrical, molded in approximate center on the interior side of bottom 40. A snap action socket exterior section 42A is cylindrically-shaped and has an interior section that is a spherical open ended socket contouring to section 102 of arm 96, section 42A molded in the approximate center onto bottom 40. A pole clip 32 that is a tubular piece including a molded gap 34 in the center on a top side of clip 32 along the entire length, a bottom side of clip 32 connecting to the center of the top exterior side of lid 22. In the preferred embodiment, the cylindrical plastic housing, part # 251300, provided by LA CONS of Yorba Linda Calif. was used. Holder 27, sections 42 and 42A, clip 32 and pins 53 were functionally designed and integrally attached to the cylindrical plastic housing, to illustrate a working injection molded alarm 20 prototype. Hole 58, and hole 62 were drilled into the prototype. All injection molded elements of alarm 20, with the exception of arm 96 consist of polypropylene. However, these elements can consist of any other material that can be injected molded, such as polyethylene, vinyl, nylon, rubber, or any other plastic materials.

As shown in FIGS. 2, 8, and 9 a plurality of rubber grommets 55 install around a circumference of a molded lamp hole 58 and a molded buzzer hole 62.

FIG. 13 shows a schematic diagram of an electrical circuit for the preferred embodiments of the present invention.

Referring to FIG. 1, actuator arm 96 is a first means for initiating completion of the electrical circuit, for holding a fishing line 38, by slot 100 (see FIG. 3) integrally connecting to lever 78 of switch 66 as shown in FIGS. 4, 6A, and 10, and arm (see FIG. 10). Arm 96 forwardly actuates when line 38 within arm 96 is being tensioned as shown in FIG. 2, thus arm 96 operates as the primary element of switch 66. Arm 96 holds line 38, by line 38 installing from the bottom of, and into arm 96. Section 102 supplies forward and back rotational movement allowing smooth actuation of arm 96, by snapping into section 42A contouring to section 102. A small portion of section 104 protruding from bottom center of section 102 functions within section 42A, the remaining portion adds length to arm 96. Section 106 containing slot 100A, slit 110, and hole 100B also adds length to arm 96. Added length provides for more efficient actuation movement in relation to the laws of leverage, longer length, least resistance for actuating, and gives an angler more to hold and see when installing line 38 into arm 96. Slot 100A installs line 38 within arm 96, whereas slit 110 enables resistance of forward and backward line movement to allow actuation of arm 96, by receiving line 38 until restriction of line 38 movement within silt 110 occurs allowing forward actuation of arm 96 when line 38 is tensioned. Slot 100A and slit 110 prevent line 38 from falling out of arm 96, by allowing line 38 to rest in a large opening in slit 110, and on top of the touching sides of slot 10A, thus also functioning to facilitate use of alarm 20, by making it necessary to install line 38 only once, during the course of day or night fishing activity. Hole 100B supplies tension relief to arm 96 while line 38 is held within arm 96, by allowing line 38 to be pulled through slit 110 and into hole 100B, as increased tensioning to line 38 occurs thus relieving arm 96 of tension from line 38. The large opening in slit 110 and hole 100B for allowing allows line 38 freedom of forward movement to any desired location when line 38 is cast, by supplying zero resistance of forward and backward line movement within slit 110 and hole 100B.

Socket 56 receiving lamp 57, and buzzer 60 are a second means for luminating and sounding visible and audible alarm signals respectively, by displaying light and producing sound, alerting the angler to the presence of a fish that is either nibbling on a bait or that has been hooked.

Switch 66 comprises of housing 68 for integrally holding terminal pins 74 and 76, support pins 72, switch lever 78, contact point 88, contact arm 86, and top 92 including stop pin 94. Pins 74 and 76 are soldered to lamp 57, buzzer 60, and connector 31 allowing switch 66 to function as a whole, for closing and opening the electrical circuit of alarm 20. Support pins 72 connect on bottom side of board 50, giving housing 68 more stability, than just soldered terminal pins 74 and 76 would by themselves. Switch 66 is a third means for completing the electrical circuit delivering electrical energy for activating lamp 57 and buzzer 60, by lever 78 connecting to spring clip 84 that is connected to contact arm 86, and by lever 78 integrally connecting to top slot 100 in arm 96, as shown in FIGS. 4, 6A, and 10, allowing contact arm 86 to make contact with contact point 88 when arm 96 is completely actuated, resulting from line 38 within arm 96 being fully tensioned. Tension spring clip 84 eliminates false alarm signals from lamp 57 and buzzer 60, by supplying resistance against actuation of arm 96 when line 38 within arm 96 is semi-tensioned due to water conditions, or movement of a live bait fish on a hook, or when line 38 within arm 96 is being cast from a reel 35. Switch lever 78 and tension spring clip 84, enables a self-adjusting unactuated alarm ceasing position, by allowing arm 96 to automatically return to the self-adjusting unactuated alarm ceasing position, when line 38 within arm 96 is untensioned or pulled into hole 100B, causing contact arm 86 to separate from contact point 88, as shown in FIG. 6, thus ceasing the alarm signals. Tee section 79 and L section 80 prevent side to side movement of actuator arm 96, by tightly fitting on each side of stem section 98. Switch 66 supplies clearance space to allow actuation movement of actuator arm 96, by supplying space between a bottom side of tension spring clip 84, and board 50 as shown in FIG. 10 also by supplying space around top 92 with integral contouring left and right sides, allowing proper actuation movement of lever 78 integrally connected to arm 96. L section 80 and stop pin 94 create a primary stopping point for actuator arm 96, by section 80 making contact with stop pin 94, thus stopping lever 78 from moving too far forward when arm 96 is fully actuated, and preventing damage to elements of switch 66 caused by over tensioning of line 38 within arm 96, or should someone attempt to pull arm 96 excessively backward from the self-adjusting unactuated alarm ceasing position. Top 92 prevents outside sources from interfering with the functioning of switch 66, occurring with frequent opening of the cylindrical plastic housing, by covering elements of switch 66.

Battery 29 is a fourth means for supplying electrical energy to lamp socket 56 receiving lamp 57, buzzer 60, and switch 66.

Battery connector 31 is a fifth means for connecting to battery 29 allowing battery 29 to supply electrical energy to lamp socket 56 receiving lamp 57, buzzer 60, and switch 66.

Round printed circuit board 50 is a sixth means for holding and connecting thereto, lamp socket 56 receiving lamp 57, buzzer 60, switch 66, and battery connector 31. Hole 52 supplies actuating space to actuator arm 96, by allowing stem section 98 adequate forward and back movement within hole 52, Hole 52 creates a secondary stopping point for actuator arm 96, by causing stem section 98 to stop when making contact with the edge of hole 52 should the primary stopping point of switch 66 fail, thus further preventing damage to elements within switch 66 caused by over tensioning of line 38 within arm 96, or should someone attempt to pull arm 96 excessively backward from the unactuated alarm ceasing position. Hole 52 allows integral installation of actuator arm 96 to switch 66, by supplying slotted stem section 98 access for integrally connecting to switch lever 78.

An opaque injection molded cylindrical plastic housing is a seventh means for opening and closing alarm 20, for enclosing lamp socket 56 receiving lamp 57, switch 66, battery 29, battery connector 31, and circuit board 50, for keeping components of alarm 20 safe from weather elements, for preventing outside sources from interfering with the functioning of alarm 20, by lid 22 closing onto body 36 with lips 26 and 26A creating a water tight seal. Battery holder 27 secures battery 29 inside the opaque injection molded cylindrical plastic housing, by allowing battery 29 to be snapped securely into place, eliminating the possibility of battery 29 moving around within alarm 20. Lamp hole 58 and buzzer hole 62 for allowing allow lamp 57 and buzzer 60 to be installed and seen and heard externally from alarm 20, by enabling a screw base of lamp 57 to be installed through lamp hole 58 and into lamp socket 56, from an exterior side of housing body 36, leaving the luminating portion of lamp 57 externally exposed from housing body 36, and by aligning the sound hole in buzzer 60 with buzzer hole 62 in housing body 36, allowing the audible alarm signal to pass outwardly through buzzer hole 62. Board pins 53 secure printed circuit board 50 inside housing body 36, by aligning with, and being received by the plurality of stationary board pin holes 51 within board 50 at the plurality of points. Board pins 53, and interior section 42 evenly balance and fortify the edge and center of board 50 when board 50 is installed onto board pins 53 and interior section 42, by portions of the board pins being the same height as open ended interior section 42, and board pins 53 positioned inward from the outer circumference of the interior side of housing bottom 40 at the plurality of points. Exterior section 42A allows arm 96 to rotate freely with uniform frictional drag by the interior of exterior section 42A that is the spherical open ended socket contouring to section 102.

Pole clip 32 is an eighth means for connecting the cylindrical plastic housing to a fishing rod 33, by snapping a section of rod 33 through gap 34 and into clip 32, with clip 32 securely contouring to rod 33.

The plurality of stationary board pin holes 51 within board 50 at the plurality of points is a ninth means for receiving the plurality of stationary board pins 53 for securing circuit board 50 inside the cylindrical plastic housing, by pin holes 51 aligning with, and slipping over board pins 53.

The plurality of rubber grommets 55 is a tenth means for making lamp hole 58 water tight after lamp 57 is installed into lamp socket 56, and for eliminating the loss of the alarm signal from buzzer 60 heard externally from alarm 20, by installing around the circumference of lamp hole 58 creating a water tight seal after lamp 57 is installed into lamp socket 56, by installing around the circumference of buzzer hole 62 and tightly butting against a face of buzzer 60 creating a tight fit around the sound hole of buzzer 60 when board 50 is installed inside the cylindrical plastic housing, allowing the alarm signal from buzzer 60 to be directly projected outwardly rather than dissipating within the cylindrical plastic housing.

FIG. 11 shows a three position switch 64, and a PC mountable battery holder 54 soldered onto board 50.

FIG. 12 shows switch 64 aligning with a molded switch hole 65 within housing body 36, when board 50 is installed on the interior side of bottom 40.

FIG. 14 shows a schematic diagram of an electronic circuit for switch 64.

FIG. 15 shows section 102 contained in an open ended exterior section 42B, exterior section 42B having an interior that is non-spherical. Exterior section 42B is molded onto bottom 40.

Figure 16:
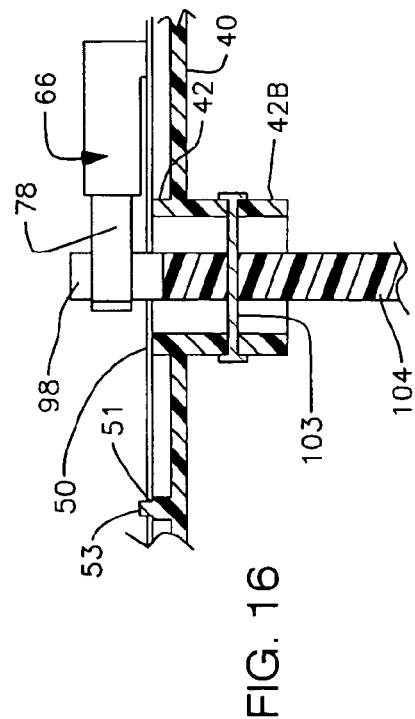
FIG. 16 is a cross sectional view of preferred and additional embodiments of the present invention.

FIG. 16 shows a pivot pin 103 inserting through arm 96 and through each side of exterior section 42B having an interior that is non-spherical. Exterior section 42B is molded onto bottom 40.

Figure 17:
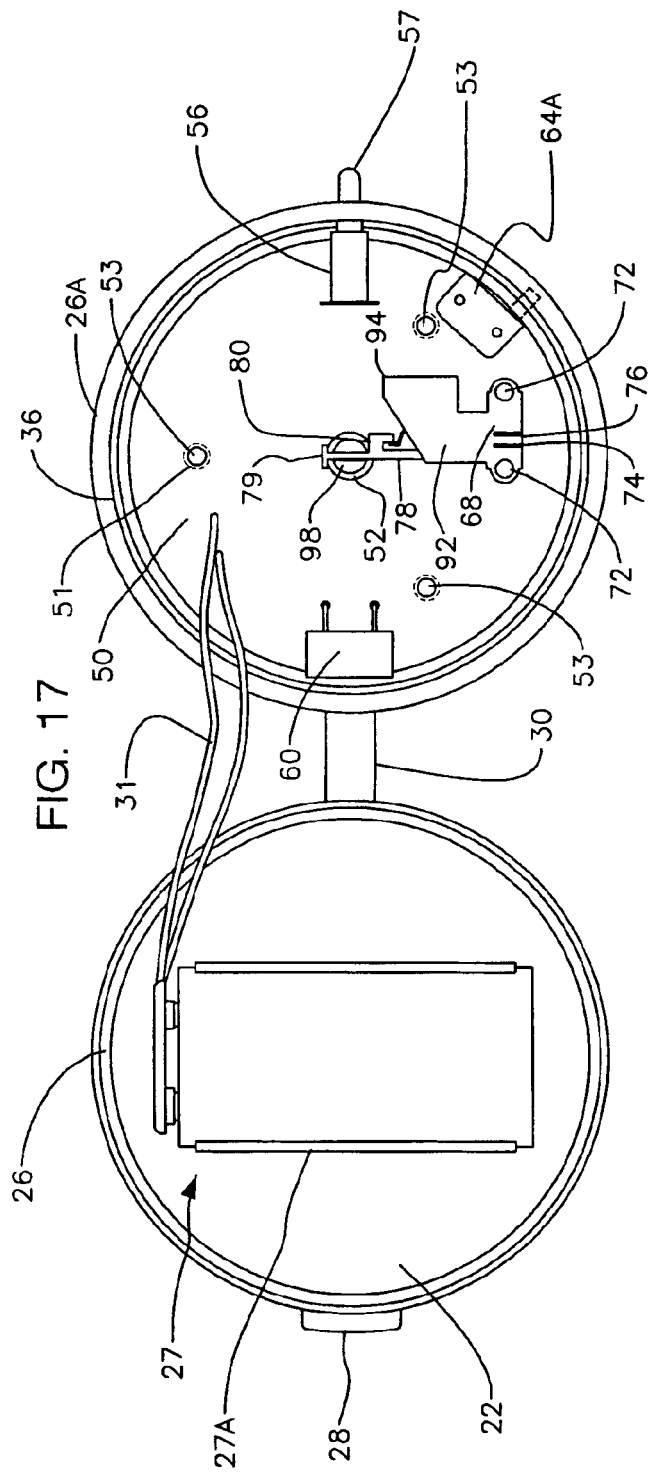
FIG. 17 is an orthographic assembly view of preferred and additional embodiments of the present invention.

FIG. 17 shows a five position switch 64A soldered onto board 50.

Figure 17A:
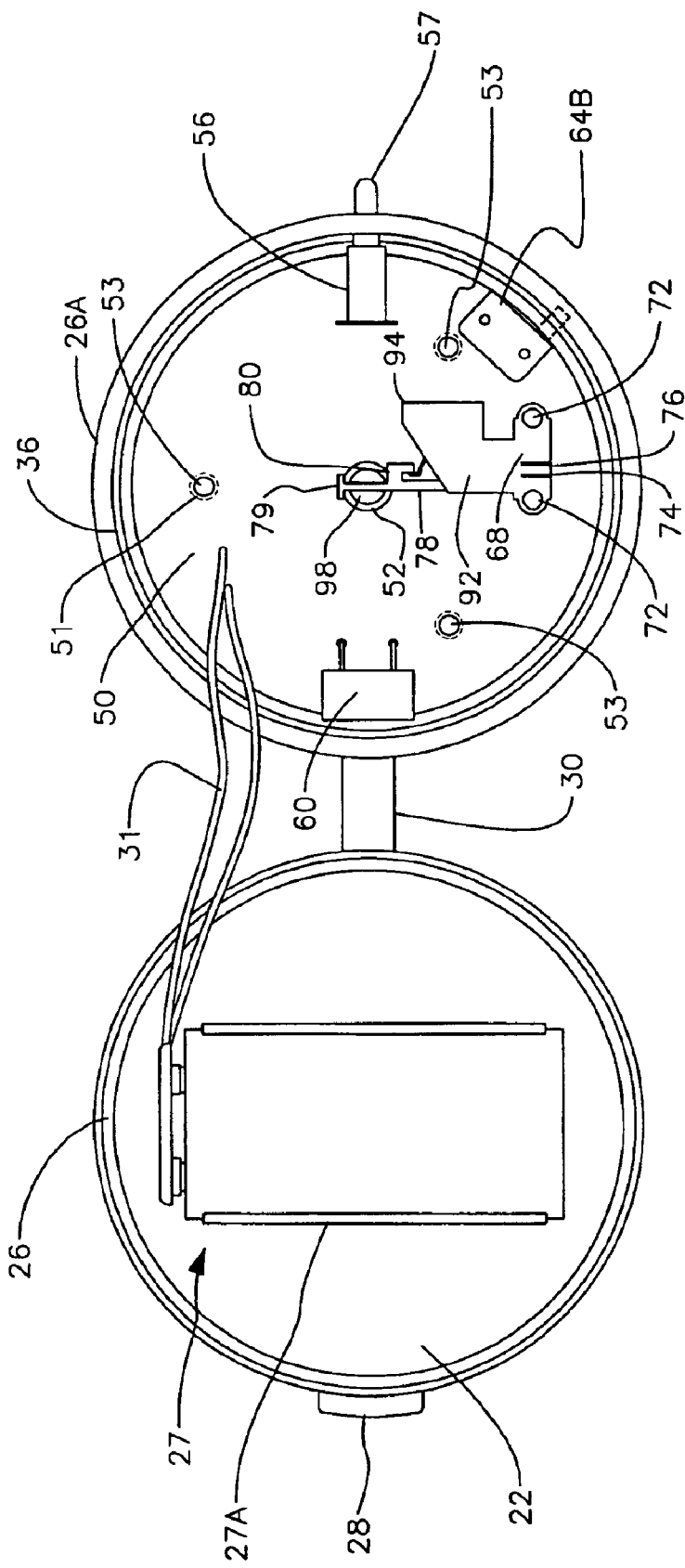
FIG. 17A is an orthographic assembly view of preferred and additional embodiments of the present invention.

FIG. 17A shows a four-position switch 64B soldered onto board 50.

Figure 17B:
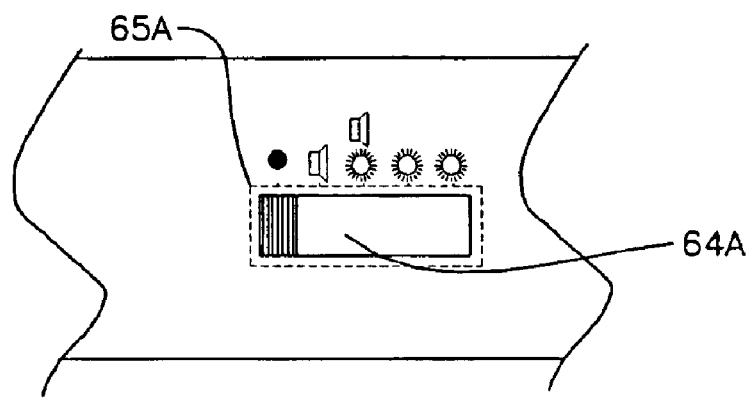
FIG. 17B is an isolated orthographic view of an additional embodiment of the present invention.

FIG. 17B shows switch 64A aligning with a molded switch hole 65A within housing body 36, when board 50 is installed on the interior side of bottom 40.

Figure 17C:
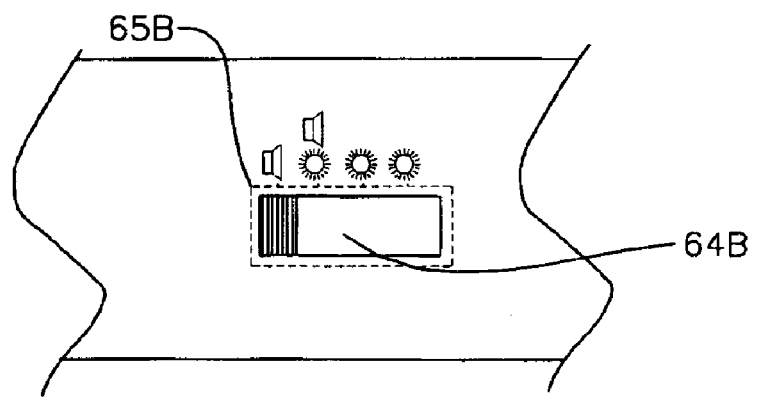
FIG. 17C is an isolated orthographic view of an additional embodiment of the present invention.

FIG. 17C shows switch 64B aligning with a molded switch hole 65B within housing body 36, when board 50 is installed on the interior side of bottom 40.

Figure 18:
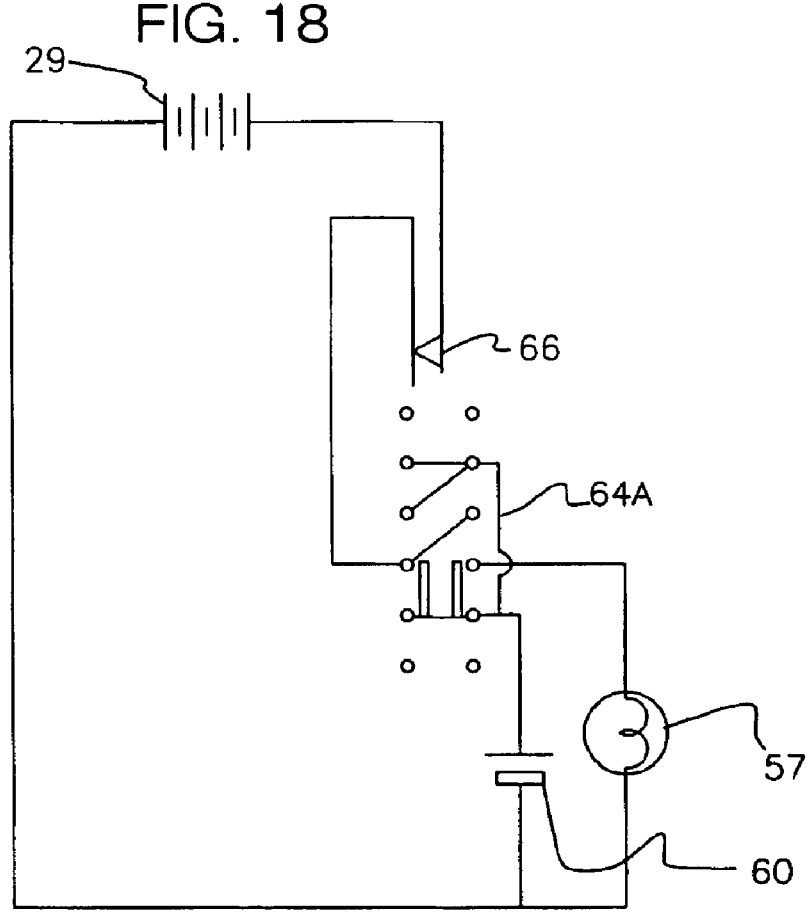
FIG. 18 is a schematic diagram of the preferred and additional embodiments of the present invention.

FIG. 18 shows a schematic diagram of an electronic circuit for switch 64A.

Figure 18A:
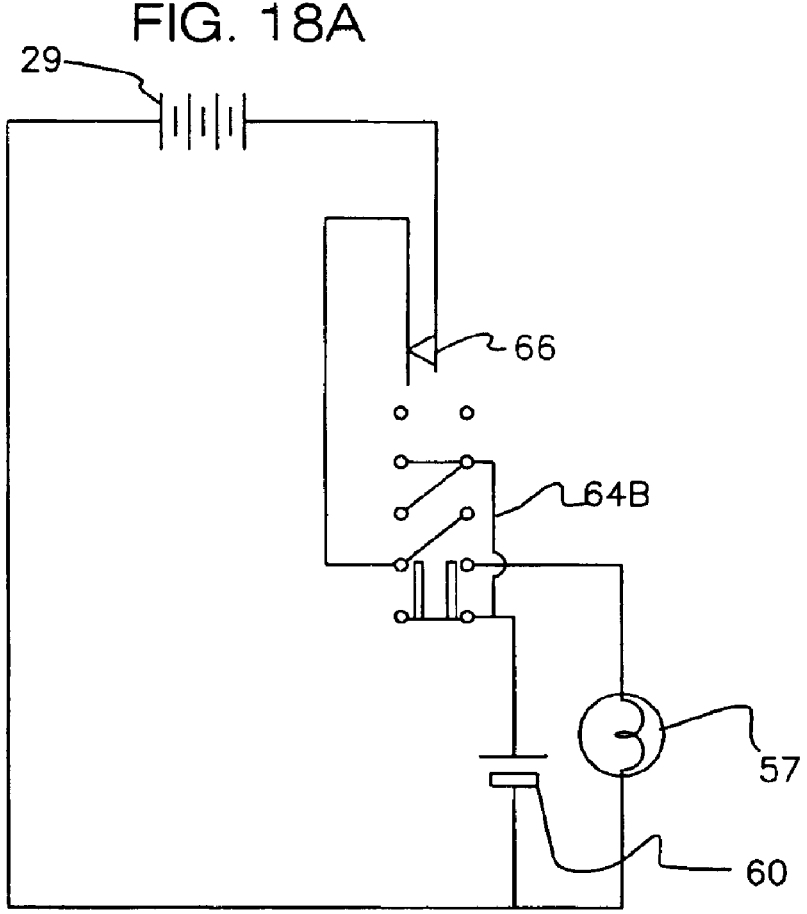
FIG. 18A is a schematic diagram of the preferred and additional embodiments of the present invention.

FIG. 18A shows a schematic diagram of an electronic circuit for switch 64B.

Three position switch 64 is an eleventh means for diverting electrical energy between socket 56 receiving lamp 57, and buzzer 60, by directing electrical energy to either socket 56 receiving lamp 57, or buzzer 60, or both.

Open ended exterior section 42B is a twelfth means for containing pivot ball section 102, that is free floating, by pivot ball section 102 not touching the interior of open ended exterior section 42B, with the functioning of alarm 20 depending on an integral connection of section 98 to lever 78, allowing arm 96 to rotate when line 38 within arm 96 is tensioned.

Battery holder 54 is a thirteenth means for securing battery 29 onto board 50 inside the cylindrical plastic housing, by allowing battery 29 to be snapped securely into place, eliminating the possibility of battery 29 moving around within the cylindrical plastic housing.

Switch hole 65 is a fourteenth means for allowing access to a switch lever on switch 64, by allowing the switch lever to protrude externally from housing body 36.

Pivot pin 103 is a fifteenth means for allowing arm 96 stable forward and back actuation movement by installing through a hole in one side of exterior section 42B, then through a hole in arm 96, then through a hole in the other side of exterior section 42B, allowing arm 96 to securely rest on pivot pin 103 thus eliminating all unnecessary play and movement in the actuator arm, except for smooth forward and back actuation movement as directed when the fishing line within arm 96 is tensioned then untensioned.

Five position switch 64A is a sixteenth means for diverting electrical energy between lamp socket 56, receiving lamp 57, and buzzer 60 and for supplying electrical energy to lamp 57 and to buzzer 60 at the same time, and for enabling the "constantly on" position for lamp 57 while alarm 20 is in the unactuated alarm ceasing mode, and for preventing the flow of electrical energy at the same time to lamp 57, and to buzzer 60, and to switch 66, by setting switch 64A to the desired position assigned to complete each specifically mentioned function.

Molded switch hole 65A is a seventeenth means for allowing access to the switch lever on switch 64A, by allowing the switch lever to protrude externally from housing body 36.

Four position switch 64B is an eighteenth means for diverting electrical energy between lamp socket 56, receiving lamp 57, and buzzer 60 and for supplying electrical energy to lamp 57 and to buzzer 60 at the same time, and for enabling the "constantly on" position for lamp 57 while alarm 20 is in the unactuated alarm ceasing mode, by setting switch 64B to the desired position assigned to complete each specifically mentioned function.

Molded switch hole 65B is a nineteenth means for allowing access to the switch lever on switch 64B, by allowing the switch lever to protrude externally from housing body 36.

Alarm 20 is assembled by opening lid 22, installing grommets 55 into holes 58 and 62, then lowering the assembled board 50 into the cylindrical plastic housing while aligning socket 56 with hole 58, the sound hole of buzzer 60 with hole 62, centered hole 52 over interior section 42 that aligns with exterior section 42A, also aligning pin holes 51 within board 50 with, and slipping over pins 53, then pushing board 50 onto the bases of pins 53 and interior section 42. Pins 53 are then melted onto board 50 with a soldering gun, integrally connecting board 50 to the interior of bottom 40. Arm 96 is then installed by first inserting stem section 98 upwardly inward, from the bottom of exterior section 42A, while aligning top slot 100 to integrally receive lever 78, continuing to upwardly install arm 96, until section 102 snaps securely into section 42A, and slot 100 integrally connects to lever 78. Battery 29 is installed into holder 27, and battery connector 31 is attached. Lid 22 is then closed onto body 36, and lamp 57 is screwed into socket 56 through hole 58. Alarm 20 is connected in front of reel 35 to rod 33 with clip 32. Line 38 is threaded through slot 100A to slit 110, a reel bail 37 on reel 35 is opened, line 38 is cast and bail 37 is closed, line 38 is then adjusted leaving enough slack between the rear of alarm 20 and the front of reel 35 to allow for forward arm 96 movement as shown in FIG. 1. Line 38 is inserted further into slit 110 until the desired resistance of forward and backward line movement within section 106 is achieved. Applied tension to line 38 forces arm 96 integrally connected to lever 78 to actuate. Tension spring clip 84 connected to lever 78 and contact arm 86, enables contact arm 86 to be pulled closer to contact point 88 as arm 96 actuates, until arm 86 touches point 88 thus completing the electrical circuit activating lamp 57 and buzzer 60. When a fish is hooked and tries to free itself, increased tensioning to line 38 occurs pulling line 38 through slit 110 and into hole 100B, releasing the tension placed on arm 96, tension spring clip 84 then allows arm 96 to return to the self-adjusting unactuated alarm ceasing position, also causing contact arm 86 to break contact with contact point 88, thus ceasing the alarm signals. The fish is then reeled in and taken off the hook, and the whole procedure is repeated.

From the description above, a number of advantages of our tension measured fishing line bite detector alarm become evident. The appearance of our bite detector alarm is pleasing to the eye, making it desirable to use. The compactness of our assembled bite detector alarm makes storage very easy, eliminating the need to install and uninstall the actuator arm, or any other element each time the unit is used. The integral design of our bite detector alarm secures and fortifies all components, thus eliminating the need to worry about losing parts or pieces, that could occur resulting from the need to constantly tighten, readjust, and reassemble elements as some fish bite indicators require, as well as keeping all components safe from weather elements, and any other outside interference to their required functions. The design relationship between the snap action socket exterior section, and the pivot ball section, provide smooth and even actuation of the actuator arm when the fishing line within the actuator arm is tensioned. The integral design relationship between the upper common contact point, the common leaf contact arm, the tension spring clip, the switch lever, and the slotted stem section, further assures the successful completion of the electrical circuit, as these five elements integrally work together as a whole, to complete the electrical circuit, as opposed to a number of elements all working independently of each other, at the same time and in sequence, towards the completion of the electrical circuit. The design relationship between the tension spring clip, the switch lever, and the slotted stem section, allows the actuator arm to return to the unactuated alarm ceasing position, thus automatically ceasing the alarms, without the assistance from any independently working elements. The design relationship also automatically gives protection against false alarm signal readings when the fishing line is semi-tensioned from waves, currents, the movement of a live bait fish on the hook, or when the fishing line is being cast from the reel, by providing resistance against the actuation of the actuator arm. The design of the bottom slot and the line hole in the actuator arm, enables the fishing line to be installed, held, and cast with complete freedom of forward movement to the desired location without falling out of the actuator arm, thus eliminating the need of having to reinsert the fishing line back into the actuator arm every time after a fish is caught. The design of the variable sized slit in the actuator arm gives the fishing line, resistance of forward and backward line movement to allow actuation movement of the actuator arm, for completing the electrical circuit activating the alarm signals, when the fishing line is tensioned. Because the lamp has a screw base, it can be changed when it burns out, thus prolonging the life of our bite detector alarm. Our bite detector alarm can be installed on the top, bottom, left or right side of the rod, used by left or right handers, used during the day or at night, and used by the visually and hearing impaired. The simplicity of the elements along with the injection molding method for the housing assembly, allows the manufacturing and assembly of our bite detector alarm to be truly cost effective, therefore reasonable to buy. Thus the reader will see that the bite detector alarm of the invention provides an esthetically pleasing, simple, compact, and integral device that is lightweight and highly reliable as well as economical, that can be used by persons of almost any age that have an interest in fishing.

While our above description contains many specificities, these should not be construed as limitations on the scope of the invention, but rather as an exemplification of one preferred embodiment thereof. Many other variations are possible. For example: (1) The hinge that integrally connects the housing lid to the housing body could be eliminated, and replaced with a threaded lid screwed onto a threaded body; the current snap lid system could be replaced with a lid latching system similar to the child resistant lid systems used on aspirin or medicine containers currently manufactured; (2) The lamp hole could be made larger or smaller to accommodate a larger or smaller lamp; (3) The housing lid, housing body, and housing body bottom, could be integrally injected molded in the shape of a mammal, fish, bird, insect, amphibian, reptile, triangle, square, rectangle, pentagon, hexagon, octagon, or any other outward injection molded shape that would accommodate or contour to any one or all of the required elements, while allowing them to properly function; (4) The housing lid, body, bottom, and snap action socket section, could be eliminated all together, by insetting the printed circuit board, lamp socket, buzzer, battery connector, and off-on switch, into a moldable, pourable, or sprayable hardening material, contouring to the required components while allowing them to properly function, with the actuation of the actuator arm, depending on its integral connection to the leaf on-off switch, with the pole clip connecting directly to the circuit board; (5) The lid, body, and bottom previously referenced, could also be constructed as separate parts that would accommodate or contour to any one or all of the required elements, and could be fastened together by welding, brazing, riveting, gluing, nailing, jointing, or with string, wire, clips, clamps, screws, nuts bolts & washers, hinges, or any other fastening means that would accommodate the construction of any listed alternative shape chosen; (6) In addition to being injection molded, the pole clip, hinge, finger grip protrusion, stationary board pins, the open ended interior and the snap action socket exterior sections could also be constructed separately, and fastened onto the housing lid and housing body using the same fastening methods as previously described; (7) The interior of the pole clip could be made larger or smaller, or different sized sleeves could be made to be inserted into its interior, to accommodate larger or smaller rods, and "its" esthetic appearance could be altered to reflect any alternative shape chosen; adjustable clamps, strong magnets, tie downs, or Velcro® could also be used as pole clips, or using any other connecting means that would accommodate any listed alternative shape chosen; (8) The stationary board pin bases and pin portions can be made larger or smaller, taller or shorter, and in any shape necessary to accommodated the printed circuit board used for any listed alternative shape chosen, or any other connecting means could be made and used that would secure the printed circuit board to the interior of the housing body, while fortifying and balancing "its" edge; more stationary board pins could be added for additional board support; (9) The exterior of the snap action socket exterior section could be esthetically altered to reflect any listed alternative shape chosen; (10) All previously mentioned elements of the cylindrical plastic housing can be molded from any injection moldable or poured materials, or constructed as separate parts using plastic, hard pressed cardboard, wood, metal, or glass; (11) The housing can be formed to create an indentation at the light position; such indentation could be vapor vacuum plated or treated by another coating method, thus creating a reflector for the light; (12) The printed circuit board could be manufactured to fit any molded or constructed shapes chosen; (13) The electro magnetic buzzer could be substituted with a piezo buzzer, transducer, siren, bells, or sound chip technology; (14) The filamented incandescent lamp could be substituted with a light emitting diode or a neon type lamp; the battery could be substituted with a variety of different sized batteries and a variety of voltage ranges, or with solar panel technology; (15) Heavier tension spring clips within the modified leaf on off switch could be manufactured to provide greater resistance against actuation of the actuator arm when manufacturing bite detector alarms that need to function more effectively in stronger weather elements and when catching larger fish; (16) Resistance against actuation of the actuator arm could also be achieved by attaching one end of a tension spring to the inside of the housing body lid and sliding the other end over the top of the slotted stem section of the installed actuator arm and anchoring to the switch lever of the modified leaf on-off switch or, by installing over a section of the actuator arm and over the snap action socket exterior section, a contouring grommet or, a fastening system could be moldcasted or attached partly to the actuator arm, and partly to the cylindrical plastic housing with the ends of rubber bands, springs, or any other tensioned materials attaching to each part; (17) The tee section of the modified leaf on off switch could be eliminated and the slot in the slotted stem section of the actuator arm permanently attached to the switch lever of the modified leaf on-off switch eliminating side to side actuator arm movement; (18) The modified leaf on-off switch could be substituted with a reed switch, micro switch, snap action switch, or any spring loaded switch; (19) Any sounding or luminating means, any source that provides electrical energy that can fulfill the true essence of our invention within 'its' scope, spirit, and discovery can be used; (20). The slot in the slotted stem section of the actuator arm could be made larger or smaller to accommodate a larger or smaller switch lever or, the mid arm section line holes could be added or deleted altogether, allowing the angler to cast before inserting the fishing line into the actuator arm, and to pop the fishing line out of the actuator arm, ceasing the alarm signals when fish is on, a cap could be attached over the installed slotted stem section, prohibiting the actuator arm from being uninstalled, the slotted bottom section cold be molded 90 degrees from the mid arm section forming an L with the last portion that holds the slit, the fishing line hole, and the bottom slot downwardly molded; (21) The bottom slot and the line hole in the actuator arm could be eliminated and the fishing line installed from the bottom of the actuator arm, directly through the variable sized slit molded to zero clearance, creating a strong resistance of forward and back line movement within the actuator arm, and causing the fishing line to disengage from the actuator arm when the fishing line is tensioned, thus eliminating any minor line resistance experienced at the line hole position when the line is reeled in, for any size fishing line installed within the actuator arm; with the bottom slot and the line hole eliminated, the variable sized slit could also be molded off vertical in a right side up, or upside down position on one of the edges of the actuator arm, allowing the fishing line to be installed directly through the variable sized slit from the bottom of the actuator arm, or from a location further up from the bottom of the actuator arm, also allowing a strong resistance of forward and back line movement within the actuator arm, also causing the fishing line to disengage from the actuator arm when the fishing line is tensioned, also eliminating any minor line resistance experienced at the line hole position when the line is reeled in; the length of the actuator arm could be shortened, and all of the above would apply; (22) If the additional embodiment utilizing an open ended exterior section having an interior that is non-spherical were used, the shape of the pivot ball section could be changed or eliminated all together, and a pivot pin could be inserted through the actuator arm and the walls of the open ended exterior section allowing the actuator arm to swing forward and back pivoting on the pivot pin; the pivot pin could be molded as an integral part of the actuator arm, with each of its ends snapping securely into holes molded within each side of the open ended exterior section, allowing both the actuator arm and the pivot pin to swing forward and backward when the fishing line within the actuator arm is tensioned and untensioned; (23) The snap action socket exterior section, the pivot ball section of the actuator arm, and the modified leaf on-off switch could be eliminated with the actuator arm being moldcasted as part of the housing body and the moldcasted material having memory allowing the actuator arm to go back to the unactuated position when untensioned, and the modified leaf on-off switch replaced with a mercury switch mounted to or moldcasted within the actuator arm or, a motion sensor switch mounted to the actuator arm using sensors with varying sensitivity for degrees of resistance against actuation of the actuator arm, thus completing the electrical circuit when actuation of the actuator arm is detected; (24) The actuator arm could be dipped in a material, or grommets inserted into the variable sized slit, placing them around each of its interior sides and around each exterior side of the slotted bottom section for the total length of the variable sized slit, achieving more resistance of forward and backward line movement within the actuator arm; (25) The actuator arm and the interior of the open ended interior and snap action socket exterior sections could be processed using an electro vaporization vacuum plating technique, turning the actuator arm into a contact arm that is integrally connected to a self centering spring soldered onto the circuit board, that makes contact with a contact point also soldered onto the circuit board, when the arm is forwardly actuated thus completing the electrical circuit activating the alarm signals; (26) The alarm signals could also be activated by, the interruption of the flow of light from a light emitting diode to a photo cell or a photo transistor, thus inducing an electronic sequence that arrives back at the same end and activates them, also through the use of inductive device type switches or electrical devices using inductance through IC or transistor switch usage, in conjunction with any resistive device used in or in place of a switch, together with a transistor, IC chip, or the combination of the two; (27) The printed circuit board could be constructed utilizing foil type circuitry, or hand wired; (28) Additionally, the bite detector alarm's mechanism or any modifications to it previously described, could be miniaturized to be incorporated into a rod handle, or as an integral part of a fishing reel; (29) The bite detector alarm may be employed as a counter; (30) An open or closed door indicator; (31) A position indicator; (32) Used for children's toys; (33) As a mechanism used in military armament and other sports related firearms; and (34) The actuator arm by itself could be used as a fish bite indicator by molding it with a highly visible translucent glow in the dark material, inserting a portion of the fishing line in front of the reel, into the variable sized slit in the slotted bottom section with the actuator arm hanging downward underneath the inserted fishing line, the weight of the arm would sag the fishing line and any fish bites would be indicated and visually seen by the upward movement of the actuator arm as the fish line is tensioned.

Therefore, without departing from the spirit and scope of this invention, one of ordinary skill in the art can make the foregoing modifications, and many other changes and modifications to the bite detector alarm of the present invention, to adapt it to specific usages and conditions. As such, these changes and modifications are properly, equitably, and intended to be, within the full range of equivalents of the following claims.

What is claimed is:

1. Fishing line bite detector alarm comprising:
   (A) a first means for holding a fishing line, said means integrally including a slit for enabling resistance of forward and backward movement of said fishing line held within said means as the line is inserted further into the slit until the desired resistance of forward and backward line movement within said slit occurs, thereby allowing actuation of said means in response to forward and backward line tension, said means further integrally including a spherical pivot ball section for supplying forward and back rotational movement of said means in response to forward and backward line movement;
   (B) a second means for luminating and sounding visible and audible alarm signals respectively;
   (C) a third means for completing an electrical circuit delivering electrical energy for activating said second means, said means including a lever that is connected to the first means;
   (D) a fourth means for supplying electrical energy to said second and third means;
   (E) a fifth means for connecting to said fourth means and for allowing said fourth means to supply electrical energy to said second means and said third means;
   (F) a sixth means for holding and connecting thereto said second, third and fifth means;
   (G) a seventh means for opening and closing said fishing line bite detector alarm, for enclosing said second means, said third means, said fourth means, said fifth means, and said sixth means of said fishing line bite detector alarm, the seventh means including an exterior section that is a spherical open ended socket contouring to the pivot ball, said pivot ball snapping into the exterior section thereby allowing the first means to rotate freely with uniform frictional drag, wherein said first means connects within said seventh means, and wherein said fourth, and sixth means connect within said seventh means; and
   (H) an eighth means for attaching said bite detector alarm to a fishing rod, said eighth means connecting to said seventh means.

2. The fishing line bite detector of claim 1 wherein said second means is a PC board mountable lamp socket receiving a filamented incandescent screw based lamp, and a PC board mountable electro magnetic buzzer, said lamp and said buzzer for luminating and sounding said alarm signals respectively, by displaying light and producing sound alerting an angler to the presence of a fish that is either nibbling on a bait or that has been hooked.

3. The fishing line bite detector alarm of claim 1 wherein said third means is a PC board mountable modified leaf on-off switch including an upper common contact terminal pin and a common leaf contact arm terminal pin, both molded in a switch housing, approximate left and right sides of said switch housing comprising a plurality of molded circular switch support pins extending down, a switch lever having an L section molded horizontally outward then vertically downward lateral a side of said switch lever, a tee section horizontally molded lateral a top end of said switch lever, said switch lever being molded to and extending from said switch housing, an upper common contact point and a common leaf contact arm, both running parallel with said switch lever, a tension spring clip attaching to said L section and said common leaf contact arm, a molded top with integral contouring left and right sides including a switch lever stop pin, said switch for completing said electrical circuit delivering electrical energy for activating a filamented incandescent screw based lamp and a PC board mountable electro magnetic buzzer, by said switch lever connecting to said tension spring clip that is connected to said common leaf contact arm, and by said switch lever integrally connecting to a top slot, in an actuator arm, allowing said common leaf contact arm to make contact with said upper common contact point when said actuator arm is completely actuated, resulting from said line within said actuator arm being fully tensioned, said tension spring clip for eliminating false alarm signals from said lamp and said buzzer, by supplying resistance against actuation of said actuator arm when said line within said actuator arm is semi tensioned due to water conditions, or movement of a live bait fish on a hook, or when said line within said actuator arm is being cast from a reel, said switch lever, and said tension spring clip, for enabling a self-adjusting unactuated alarm ceasing position, by allowing said actuator arm to automatically return to said self-adjusting unactuated alarm ceasing position when said line within said actuator arm is untensioned or pulled into said line hole, causing said contact arm to separate from said contact point thus ceasing said alarm signals, said tee and said L section for preventing side to side movement of said actuator arm by tightly fitting on each side of a slotted stem section, said switch for supplying clearance space to allow actuation movement of said actuator arm, by supplying space between a bottom side of said tension spring clip and said sixth means, also by supplying space around said top with integral contouring left and right sides, allowing proper actuation movement of said switch lever integrally connected to said actuator arm, said L section and said stop pin for creating a primary stopping point for said actuator arm, by said L section making contact with said stop pin, thus stopping said switch lever from moving too far forward when said actuator arm is fully actuated, and preventing damage to elements of said switch, caused by over tensioning of said line within said actuator arm, or should someone attempt to pull said actuator arm excessively backward from said self-adjusting unactuated alarm ceasing position, said top with integral contouring left and right sides for preventing outside sources from interfering with the functioning of said on-off switch, occurring with frequent opening of said seventh means, by covering elements of said on-off switch.

4. The fishing line bite detector alarm of claim 1 wherein said fourth means is a battery, said battery for supplying electrical energy to a PC board mountable lamp socket receiving a filamented incandescent screw based lamp, a PC board mountable electro magnetic buzzer, and a PC board mountable modified leaf on-off switch.

5. The fishing line bite detector alarm of claim 1 wherein said fifth means is a battery connector, said battery connector for connecting to a battery allowing said battery to supply electrical energy to a PC board mountable lamp socket receiving a filamented incandescent screw based lamp, a PC board mountable electro magnetic buzzer, and a PC board mountable modified leaf on-off switch.

6. The fishing line bite detector alarm of claim 1 wherein said sixth means is a round printed circuit board, having a PC board mountable lamp socket receiving a filamented incandescent screw based lamp, a PC board mountable electro magnetic buzzer, a PC board mountable modified leaf on-off switch, and a battery connector soldered thereto, said circuit board comprising a centered hole, said switch soldered onto said circuit board so that a switch lever is positioned centrally over said centered hole, placing a tee section on approximate edge of said centered hole, a face of said lamp socket, a sound hole of said buzzer, and said battery connector positioned on approximate edge of said circuit board at a plurality of points, said centered hole for supplying actuating space to an actuator arm by allowing a slotted stem section adequate forward and back movement within said centered hole, said centered hole for creating a secondary stopping point for said actuator arm, by causing said stem section to stop when making contact with the edge of said centered hole should a primary stopping point of said switch fail, thus further preventing damage to elements within said switch caused by over tensioning of said line within said actuator arm, or should someone attempt to pull said actuator arm excessively backward from a self-adjusting unactuated alarm ceasing position, said centered hole for allowing integral installation of said actuator arm to said switch by supplying said stem section access for integrally connecting to the switch lever.

7. The fishing line bite detector alarm of claim 1 wherein said seventh means is an opaque injection molded cylindrical plastic housing, comprising an operatable housing lid, said housing lid including a vertical side having a molded horizontal lip lateral an interior surface of said vertical side, a finger grip protrusion molded onto an exterior side of said housing lid, a battery holder molded onto an interior side of said housing lid, a housing body comprising a cylindrical vertical side having a horizontal lip molded lateral the exterior circumference of said cylindrical vertical side, said housing body including a hinge molded onto said exterior side of said housing lid and onto said horizontal lip lateral the exterior circumference of said cylindrical vertical side, said housing body including a molded lamp hole and a molded buzzer hole thereinto, said housing body molded to a cylindrical housing bottom having a plurality of stationary board pins molded onto an interior side of said housing bottom at a plurality of points, an open ended interior section that is cylindrical, molded on said interior side of said housing bottom, a snap action socket exterior section that is said spherical open ended socket contouring to the pivot ball, said exterior section molded onto said housing bottom, said plastic housing for enclosing a PC board mountable lamp socket receiving a filamented incandescent screw based lamp, a PC board mountable electro magnetic buzzer, a PC board mountable modified leaf on-off switch, a battery, a battery connector, and a round printed circuit board, of said fishing line bite detector alarm, said plastic housing for keeping components of said fishing line bite detector alarm safe from weather elements, for preventing outside sources from interfering with the functioning of said fishing line bite detector alarm, by said housing lid closing onto said housing body with said horizontal lips creating a water tight seal, said battery holder for securing said battery inside said plastic housing by allowing said battery to be snapped securely into place, eliminating the possibility of said battery moving around within said fishing line bite detector alarm, said molded lamp and said molded buzzer holes for allowing said alarm signals, to be installed and seen and heard externally from said fishing line bite detector alarm, by enabling a screw base of said lamp to be installed through said molded lamp hole and into said lamp socket, from an exterior side of said housing body, leaving a luminating portion of said lamp externally exposed from said housing body, and by aligning a sound hole in said buzzer with said molded buzzer hole in said housing body, allowing the audible alarm signal to pass outwardly through said molded buzzer hole, said board pins for securing said circuit board inside said housing body by aligning with, and being received by, a plurality of stationary board pin holes within said circuit board at a plurality of points, said board pins, and said open ended interior section, for evenly balancing and fortifying the edge and center of said circuit board when said circuit board is installed onto said board pins and said open ended interior section, by portions of said board pins being the same height as said open ended interior section and said board pins positioned inward from an outer circumference of said interior side of said housing bottom at said plurality of points, said exterior section for allowing the actuator arm to rotate freely with uniform frictional drag, by the interior of said exterior section contouring to the pivot ball.

8. The fishing line bite detector alarm of claim 1 wherein said eighth means is a pole clip that is a tubular piece including a molded gap in a center on a top side of said pole clip along the entire length, a bottom side of said pole clip connecting to a center of a top exterior side of a housing lid, said pole clip for attaching said fishing line bite detector alarm to said rod, by snapping a section of said rod through said molded gap and into said pole clip, with said pole clip securely contouring to said rod.

9. The fishing line bite detector alarm of claim 6 further including a ninth means for receiving a plurality of stationary board pins for securing said printed circuit board inside an opaque injection molded cylindrical plastic housing.

10. The fishing line bite detector alarm of claim 9 wherein said ninth means is a plurality of stationary board pin holes within said printed circuit board at a plurality of points, said board pin holes for receiving said board pins, by said board pin holes aligning with, and slipping over said board pins.

11. The fishing line bite detector alarm of claim 1 further including a tenth means for making a molded lamp hole water tight, after a filamented incandescent screw based lamp is installed into a PC board mountable lamp socket, and for eliminating the loss of said audible alarm signal from a PC board mountable electro magnetic buzzer heard externally from said fishing line bite detector alarm.

12. The fishing line bite detector alarm of claim 11 wherein said tenth means is a plurality of rubber grommets, said grommets for making said lamp hole water tight, by installing around the circumference of said lamp hole, creating a water tight seal after said lamp is installed into said lamp socket, said grommets for eliminating the loss of the audible alarm signal from said buzzer heard externally from said fishing line bite detector alarm, by installing around the circumference of a molded buzzer hole, and tightly butting against a face of said buzzer, creating a tight fit around a sound hole of said buzzer when a round printed circuit board is installed inside an opaque injection molded cylindrical plastic housing, allowing said alarm signal from said buzzer to be directly projected outwardly, rather than dissipating within said plastic housing.

13. The fishing line bite detector alarm of claim 1 further including an eleventh means for diverting electrical energy between a PC board mountable lamp socket receiving a filamented incandescent screw based lamp, and a PC board mountable electro magnetic buzzer.

14. The fishing line bite detector alarm of claim 13 wherein said eleventh means is a three position switch soldered onto a round printed circuit board, said three position switch for diverting electrical energy between said lamp socket receiving said lamp, and said buzzer, by directing electrical energy to either said lamp socket receiving said lamp, or said buzzer, or both.

15. The fishing line bite detector alarm of claim 1 further including a twelfth means for containing a pivot ball section that is free floating.

16. The fishing line bite detector alarm of claim 15 wherein said twelfth means is an open ended exterior section having an interior that is non spherical, said open ended exterior section molded onto a cylindrical housing bottom, said open ended exterior section for containing said pivot ball section that is free floating, by said pivot ball section not touching the interior of said open ended exterior section, with the functioning of said bite detector alarm depending on an integral connection of a slotted stem section to a switch lever allowing an actuator arm to rotate when said line within said actuator arm is tensioned.

17. The fishing line bite detector alarm of claim 1 further including a thirteenth means for securing a battery onto a round printed circuit board inside an opaque injection molded cylindrical plastic housing.

18. The fishing line bite detector alarm of claim 17 wherein said thirteenth means is a PC mountable battery holder soldered onto said printed circuit board, said battery holder for securing said battery onto said circuit board inside said plastic housing, by allowing said battery to be snapped securely into place eliminating the possibility of said battery moving around within said plastic housing.

19. The fishing line bite detector alarm of claim 7 further including a fourteenth means for allowing access to a switch lever on a PC board mountable three position switch.

20. The fishing line bite detector of claim 19 wherein said fourteenth means is a molded switch hole within a housing body, said molded switch hole for allowing access to said switch lever on said three position switch by allowing said switch lever to protrude externally from said housing body.

21. The fishing line bite detector alarm of claim 16, further comprising a fifteenth means for allowing an actuator arm stable forward and back actuation movement when the fishing line within said arm is tensioned then untensioned.

22. The fishing line bite detector alarm of claim 21 wherein said fifteenth means is a pivot pin, said pivot pin for allowing said actuator arm stable forward and back actuation movement by installing through a hole in one side of an open ended exterior section, then through a hole in said actuator arm then through a hole in an other side of said exterior section allowing said actuator arm to securely rest on said pivot pin thus eliminating all unnecessary play and movement in the actuator arm, except for smooth forward and back actuation movement as directed when the fishing line within said actuator arm is tensioned then untensioned.

23. The fishing line bite detector of claim 1 wherein said first means is an actuator arm that is a solid cylindrical injection molded piece comprising a slotted stem section, having a top slot, molded horizontally across a center of said stem section approximately 90 degrees in relation to a bottom slot, a variable sized slit, and a line hole, said bottom slot, said variable sized slit, and said line hole, all molded within a slotted bottom section, said stem section extending downward into approximate top center of said spherical pivot ball section, a mid arm section extending downward from approximate bottom center of said spherical pivot ball section and transitioning to said slotted bottom section, said bottom slot comprising rounded sides upwardly tapering until touching together and transitioning to said slit, and said slit upwardly tapering and transitioning to said line hole, said actuator arm for initiating completion of an electrical circuit, by said top slot integrally connecting to said third means and said actuator arm forwardly actuating when said line within said actuator arm is being tensioned, the actuator arm for holding said fishing line, by said fishing line installing from the bottom of, and into the actuator arm, said spherical pivot ball section for supplying forward and back rotational movement allowing smooth actuation of said actuator arm by snapping into the exterior section of said seventh means contouring to said spherical pivot ball section, said bottom slot for installing said line within said actuator arm, said slit for enabling resistance of forward and backward line movement to allow actuation of said actuator arm, by receiving said line until restriction of said line movement within said slit occurs, allowing forward actuation of said actuator arm when said line is tensioned, said bottom slot and said slit for preventing said line from falling out of said actuator arm, by allowing said line to rest in a large opening in said slit, and on top of the touching sides of said bottom slot, said line hole for supplying tension relief to said actuator arm while said line is held within said actuator arm, by allowing said line to be pulled through said slit and into said line hole as increased tensioning to said line occurs thus relieving said actuator arm of tension from said line, the large opening in said slit, and said line hole for allowing said line freedom of forward movement to any desired location when said line is cast, by supplying zero resistance of forward and backward line movement within said slit and said line hole.

24. A fishing line bite detector alarm comprising:
(A) an actuator arm for holding a fishing line, said arm integrally including a slit for enabling resistance of forward and backward movement of said fishing line held within said arm as the line is inserted further into said arm until the desired resistance of forward and backward line movement within said slit occurs, thereby allowing actuation of said arm in response to forward and backward line tension;
(B) a lamp and a buzzer for luminating and sounding visible and audible alarm signals respectively;
(C) an on-off switch for completing an electrical circuit delivering electrical energy for activating said lamp and said buzzer, said switch including a lever that is connected to the actuator arm;
(D) a five position switch for diverting electrical energy between said lamp and said buzzer, for supplying electrical energy to said lamp and said buzzer at the same time, for enabling a constantly on position for said lamp while the bite detector alarm is in an unactuated alarm ceasing mode, and for preventing the flow of electrical energy at the same time to said lamp and said buzzer and to said on-off switch, by setting the five position switch to a desired position assigned to complete each specifically mentioned function;
(E) a battery for supplying electrical energy to said lamp and said buzzer, said on-off switch, and said five position switch;
(F) a battery connector for connecting to said battery and for allowing said battery to supply electrical energy to said lamp and said buzzer, said on-off switch, and said five position switch;
(G) a circuit board for holding and connecting thereto said lamp and said buzzer, said on-off switch, said five position switch, and said battery connector;
(H) a housing body for enclosing said lamp and said buzzer, said on-off switch, said five position switch, said battery, said battery connector, and said circuit board of said fishing line bite detector alarm, wherein said actuator arm connects within said housing body, and wherein said lamp and said buzzer, said on-off switch, said five position switch, said battery, and said battery connector connects within said housing body; and (I) a pole clip for attaching said bite detector alarm to a fishing rod, said pole clip connecting to said housing body.

25. The fishing line bite detector alarm of claim 24, further comprising a switch hole formed within said housing body said hole for allowing access to a switch lever on said five position switch by allowing the switch lever to protrude externally from said housing body.

26. A fishing line bite detector alarm comprising:

(A) an actuator arm for holding a fishing line, said arm integrally including a slit for enabling resistance of forward and backward movement of said fishing line held within said arm as the line is inserted further into said arm until the desired resistance of forward and backward line movement within said slit occurs, thereby allowing actuation of said arm in response to forward and backward line tension;

(B) a lamp and a buzzer for luminating and sounding visible and audible alarm signals respectively;

(C) an on-off switch for completing an electrical circuit delivering electrical energy for activating said lamp and said buzzer, said switch including a lever that is connected to the actuator arm;

(D) a four position switch for diverting electrical energy between said lamp and said buzzer, for supplying electrical energy to said lamp and said buzzer at the same time, and for enabling a constantly on position for said lamp while the bite detector alarm is in an unactuated alarm ceasing mode, by setting the four position switch to a desired position assigned to complete each specifically mentioned function;

(E) a battery for supplying electrical energy to said lamp and said buzzer, said on-off switch, and said four position switch;

(F) a battery connector for connecting to said battery and for allowing said battery to supply electrical energy to said lamp and said buzzer, said on-off switch, and said four position switch;

(G) a circuit board for holding and connecting thereto said lamp and said buzzer, said on-off switch, said four position switch, and said battery connector;

(H) a housing body for enclosing said lamp and said buzzer, said on-off switch, said four position switch, said battery, said battery connector, and said circuit board of said fishing line bite detector alarm, wherein said actuator arm connects within said housing body, and wherein said lamp and said buzzer, said on-off switch, said four position switch, said battery, and said battery connector connects within said housing body; and (I) a pole clip for attaching said bite detector alarm to a fishing rod, said pole clip connecting to said housing body.

27. The fishing line bite detector alarm of claim 26, further comprising a switch hole formed within said housing body, said hole for allowing access to a switch lever on the four position switch by allowing the switch lever to protrude externally from said housing body.

* * * * *